US012580474B2

(12) United States Patent
Huang et al.

(10) Patent No.: US 12,580,474 B2
(45) Date of Patent: Mar. 17, 2026

(54) SWITCHING CONVERTER AND CONTROL CIRCUIT WITH IMPROVED TRANSIENT RESPONSE

(71) Applicant: SG MICRO CORP, Beijing (CN)

(72) Inventors: Linghua Huang, Beijing (CN); Haibo Zhang, Beijing (CN)

(73) Assignee: SG MICRO CORP, Beijing (CN)

(*) Notice: Subject to any disclaimer, the term of this patent is extended or adjusted under 35 U.S.C. 154(b) by 266 days.

(21) Appl. No.: 18/559,580

(22) PCT Filed: Aug. 18, 2022

(86) PCT No.: PCT/CN2022/113214
§ 371 (c)(1),
(2) Date: Nov. 8, 2023

(87) PCT Pub. No.: WO2023/280328
PCT Pub. Date: Jan. 12, 2023

(65) Prior Publication Data
US 2024/0235366 A1 Jul. 11, 2024

(30) Foreign Application Priority Data

Jul. 8, 2021 (CN) .......................... 202110771265.1

(51) Int. Cl.
| | |
|---|---|
| *H02M 1/08* | (2006.01) |
| *H02M 1/00* | (2006.01) |
(Continued)

(52) U.S. Cl.
CPC ........... *H02M 1/08* (2013.01); *H02M 1/0025* (2021.05); *H02M 1/14* (2013.01); *H02M 3/01* (2021.05); *H02M 3/156* (2013.01)

(58) Field of Classification Search
CPC ........ H02M 1/08; H02M 1/14; H02M 1/0025; H02M 1/0019; H02M 3/01; H02M 3/156; H02M 3/155; H02M 3/1582
See application file for complete search history.

(56) References Cited

U.S. PATENT DOCUMENTS

| | | | |
|---|---|---|---|
| 7,518,348 B1 * | 4/2009 | Kobayashi | ............ H02M 3/156 323/284 |
| 8,773,090 B2 | 7/2014 | Ouyang et al. | |
(Continued)

FOREIGN PATENT DOCUMENTS

| | | |
|---|---|---|
| CN | 102315773 A | 1/2012 |
| CN | 103023324 A | 4/2013 |
(Continued)

OTHER PUBLICATIONS

First Office Action, including Search Report, for Chinese Patent Application No. 202110771265.1, dated Feb. 29, 2024, 22 pages.
(Continued)

*Primary Examiner* — Jue Zhang
*Assistant Examiner* — Jye-June Lee
(74) *Attorney, Agent, or Firm* — Westman, Champlin & Koehler, P.A.

(57) ABSTRACT

The present disclosure relates to a switching converter and its control circuit. The control circuit includes an error amplifier, a transient-response compensation circuit and a PWM comparator. The transient-response compensation circuit is coupled to an output terminal of the error amplifier for increasing a differential current of the error amplifier to increase the rate of output change of the error amplifier in a case that a voltage difference between the first feedback signal and the reference voltage exceeds a predetermined threshold. The output voltage can be prevented from having too high or too low fluctuations when a load changes, thereby improving transient response characteristics of the
(Continued)

200 power converter, and optimizing dynamic characteristics of the power converter over a wide range of the fluctuation of the load in a continuous operation mode.

10 Claims, 5 Drawing Sheets

(51) Int. Cl.
H02M 1/14 (2006.01)
H02M 3/00 (2006.01)
H02M 3/156 (2006.01)

(56) References Cited

U.S. PATENT DOCUMENTS

| | | | | |
|---|---|---|---|---|
| 9,602,001 | B1 * | 3/2017 | Hung | H02M 3/158 |
| 9,606,566 | B2 | 3/2017 | Li | |
| 10,164,536 | B2 | 12/2018 | Huang | |
| 10,666,139 | B1 * | 5/2020 | Zhang | H02M 3/156 |
| 2012/0001603 | A1 | 1/2012 | Ouyang et al. | |
| 2012/0268093 | A1 | 10/2012 | Yamada | |
| 2014/0176102 | A1 * | 6/2014 | Tang | H02M 3/157 |
| | | | | 323/283 |
| 2014/0340064 | A1 | 11/2014 | Hsiao et al. | |
| 2015/0378386 | A1 | 12/2015 | Li | |
| 2018/0183337 | A1 | 6/2018 | Huang | |
| 2019/0097538 | A1 | 3/2019 | Huang | |

FOREIGN PATENT DOCUMENTS

| | | | | |
|---|---|---|---|---|
| CN | 104092360 A | 10/2014 | | |
| CN | 106817024 A | 6/2017 | | |
| CN | 105958820 B | * 5/2018 | | H02M 3/156 |
| CN | 108880249 A | 11/2018 | | |
| CN | 110427064 A | 11/2019 | | |
| CN | 109494990 B | 11/2020 | | |
| CN | 112383224 A | 2/2021 | | |
| CN | 112804790 A | 5/2021 | | |

OTHER PUBLICATIONS

International Search Report and Written Opinion for International Application No. PCT/CN2022/113214, dated Oct. 14, 2022, 8 pages.

* cited by examiner

SWITCHING CONVERTER AND CONTROL CIRCUIT WITH IMPROVED TRANSIENT RESPONSE

CROSS-REFERENCES TO RELATED APPLICATION

This application is a Section 371 National Stage application of International Application No. PCT/CN2022/113214, filed on Aug. 18, 2022, which published as WIPO Publication No. WO 2023/280328 A1, on Jan. 12, 2023, not in English, and claims priority to Chinese Patent Application No. CN202110771265.1, filed on Jul. 8, 2021, entitled "SWITCHING CONVERTER AND CONTROL CIRCUIT THEREOF", the contents of which are incorporated herein by reference in their entireties.

FIELD OF TECHNOLOGY

The present disclosure relates to the technical field of switching power supply, and in particular to a switching converter and a control circuit thereof.

BACKGROUND

With the demand for power electronics and the development of semiconductor technology, power management chips have become more widely used in portable computers, cellular telephones, personal digital assistants, and other portable or non-portable electronic devices. Switching converters employ power switches to control transfer of electrical energy from an input terminal to an output terminal, and thus can provide a constant output voltage and/or output current at the output terminal.

FIG. 1 illustrates a schematic circuit diagram of a switching converter according to the prior art. The switching converter 100 includes a power circuit and a control circuit, the power circuit includes a switching transistor M and a diode DI which are coupled in series between the input terminal and the ground, an inductor Lx which is coupled between an intermediate node of the switching transistor M and the diode DI and the output terminal, and an output capacitor Cout which is coupled between the output terminal and the ground. The input terminal of the switching converter 100 receives an input voltage Vin and the output terminal provides an output voltage Vout. The control circuit of the switching converter 100 is used to provide a switching control signal to the switching transistor M.

In the control circuit of the switching converter 100, an error amplifier EA compares a feedback voltage FB provided by a feedback network 130 with a reference voltage Vref and amplifies an error between the feedback voltage FB and the reference voltage Vref to obtain an amplified error signal Vea, and a compensation resistor Rea and a compensation capacitor Cea are used for frequency compensation of the amplified error signal Vea. The PWM comparator 120 compares the amplified error signal Vea with the ramp signal Vramp and generates a pulse width modulation signal PWM based on the comparison result, and the logic and driving circuit 110 converts the pulse width modulation signal PWM into a switching drive signal to drive a conduction state of the switching transistor M.

For a switching converter with high power output, in order to maintain the stability of the system, it is generally necessary to set the compensation capacitance Cea on the control loop to be relatively large in a case that the output capacitance Cout has a predetermined value. However, under continuous operation mode, when the load switches back and forth between light load and heavy load, it is impossible to have a large loop bandwidth because the compensation capacitance Cea is relatively large and the transconductance gm of error amplifier EA is small, which limits the transient response speed of output voltage under heavy load.

SUMMARY OF THE DISCLOSURE

In view of the above problems, it is an object of the present disclosure to provide a switching converter and a control circuit therefor, which can improve the transient response speed of the switching converter under a large load with a wide range.

According to an aspect of an embodiment of the present disclosure, there is provided a control circuit for a switching converter, which includes at least one switching transistor to control transfer of electrical energy from an input terminal to an output terminal so as to generate an output voltage in accordance with an input voltage, comprising:an error amplifier which compares a first feedback signal of the output voltage with a reference voltage to generate an error signal; a transient-response compensation circuit which is coupled to the output terminal of the error amplifier for increasing a differential current of the error amplifier to increase the rate of output change of the error amplifier in a case that a voltage difference between the first feedback signal and the reference voltage exceeds a predetermined threshold; and a PWM comparator which compares a superposition signal of a second feedback signal of the output voltage and a ripple signal with the error signal to generate a pulse width modulated signal for controlling an on time of the at least one switching transistor.

Optionally, the transient-response compensation circuit comprises:a pull-up compensation unit which is turned on when the voltage difference between the first feedback signal and the reference voltage exceeds a lower-limit threshold to provide a pull-up current to the output terminal of the error amplifier to increase a rising rate of the error signal; and a pull-down compensation unit which is turned on when the voltage difference between the first feedback signal and the reference voltage exceeds an upper-limit threshold to provide a pull-down current to the output terminal of the error amplifier to increase a falling rate of the error signal.

Optionally, the pull-up compensation unit comprises:a first transistor and a second transistor which constitute a current mirror, and each of which has a first terminal being coupled to a power supply, and a control terminal being coupled to a second terminal of the first transistor so that the control terminals of the first transistor and the second transistor are coupled with each other, wherein the second terminal of the first transistor is further coupled to a power supply terminal of the error amplifier, and the second terminal of the second transistor is further coupled to the output terminal of the error amplifier.

Optionally, the first transistor and the second transistor are PMOS transistors, respectively.

Optionally, the pull-down compensation unit comprises:a third transistor and a fourth transistor which constitute a current mirror, and each of which has a second terminal being coupled to the ground, and a control terminal being coupled to a first terminal of the third transistor so that the control terminals of the third transistor and the fourth transistor are coupled with each other, wherein the first terminal of the third transistor is further coupled to the power supply terminal of the error amplifier, and the first terminal of the fourth transistor is further coupled to the output terminal of the error amplifier.

Optionally, the third transistor and the fourth transistor are NMOS transistors, respectively.

Optionally, the control circuit further comprises:a logic and driving circuit which converts a pulse width modulation signal into a switching control signal for controlling a conduction state of the at least one switching transistor.

Optionally, the control circuit further comprises: a ripple compensation circuit for generating the ripple signal.

Optionally, the PWM comparator is a hysteresis comparator which adaptively adjusts a hysteresis voltage in accordance with the output voltage to stabilize the switching frequency.

According to another aspect of an embodiment of the present disclosure, there is provided a switching converter comprising: a power circuit which includes at least one switching transistor to control transfer of electrical energy from an input terminal to an output terminal so as to generate an output voltage in accordance with an input voltage and the above-mentioned control circuit which generates a switching control signal for controlling a conduction state of the at least one switching transistor.

Optionally, the power circuit has a topology selected from the group consisting of floating Buck-type power circuit, grounded Buck-type power circuit, flyback-type power circuit, Buck-Boost-type power circuit, Boost-type power circuit and Boost-type power circuit.

In the switching converter and the control circuit therefor according to the embodiments of the present disclosure, the control circuit further includes a transient-response compensation circuit. The transient-response compensation circuit is used to increase the differential current of the error amplifier when the output voltage deviates significantly from the reference value so as to accelerate the rate of change of the output voltage. This can prevent excessive or insufficient fluctuations in the output voltage when the load changes, improving the transient response characteristics of the switching converter and optimizing the dynamic characteristics of the switching converter over a wide range of load in a continuous operation mode. In addition, the transient-response compensation circuit in these embodiments is very simple in the circuit structure and does not require significant modifications to the conventional switching converter architecture. It has a low cost and is suitable for various conventional switching converters.

BRIEF DESCRIPTION OF THE DRAWINGS

The foregoing and other purposes, features and advantages of the present disclosure will be made clearer by the following description of embodiments of the present disclosure with reference to the accompanying drawings, in which.

DESCRIPTION OF THE EMBODIMENTS

Figure 1:
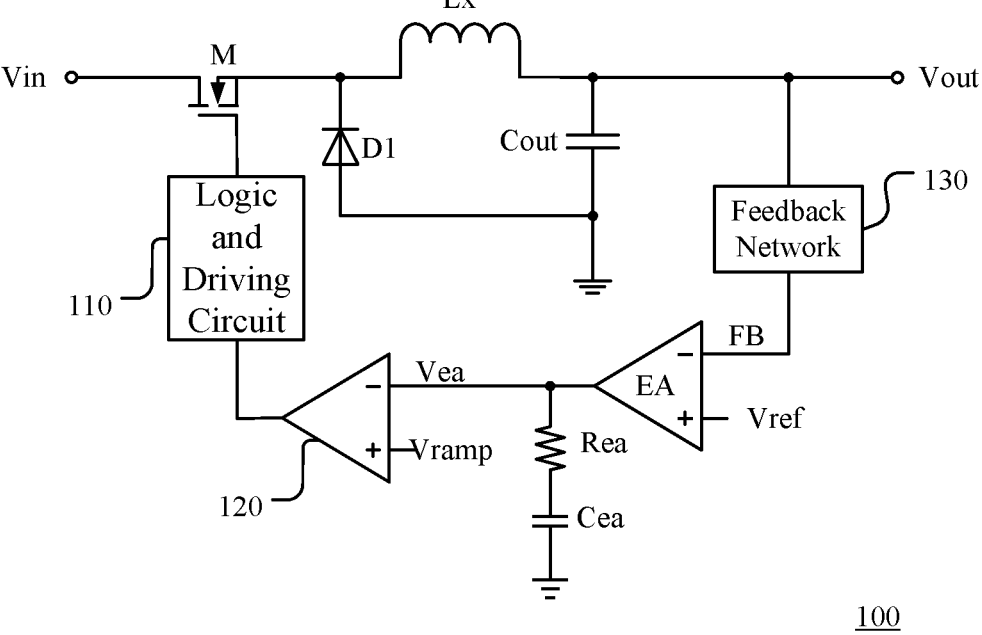
FIG. 1 illustrates a schematic circuit diagram of a switching converter according to the prior art.

Various embodiments of the the present disclosure will be described in more detail below with reference to the accompanying drawings. Throughout the various figures, like elements are denoted by the same or similar reference numerals. For the sake of clarity, various parts in the drawings are not drawn to scale. In addition, some well-known parts may not be shown.

It should be understood that in the following description, the term "circuit" refers to a conductive loop formed by at least one component or sub-circuit through an electrical or electromagnetic connection. When an component or circuit is "coupled" to another component or a component/circuit is "coupled" between two nodes, it may be directly connected or coupled to the other component, or there may be an intermediate component. The connection between the components may be physical, logical, or a combination thereof. Conversely, when a component is said to be "directly coupled" or "directly connected" to another component, it means that there is no intermediate element between them.

In the the present disclosure, a switching transistor is a transistor operating in a switching mode to provide a current path, including one selected from a bipolar transistor or a field effect transistor. The first terminal and the second terminal of the switching transistor are respectively a high potential terminal and a low potential terminal on the current path, and the control terminal is used for receiving a driving signal to control the on and off states of the switching transistor.

The present disclosure may be presented in various forms, some examples of which will be described below.

Figure 2:
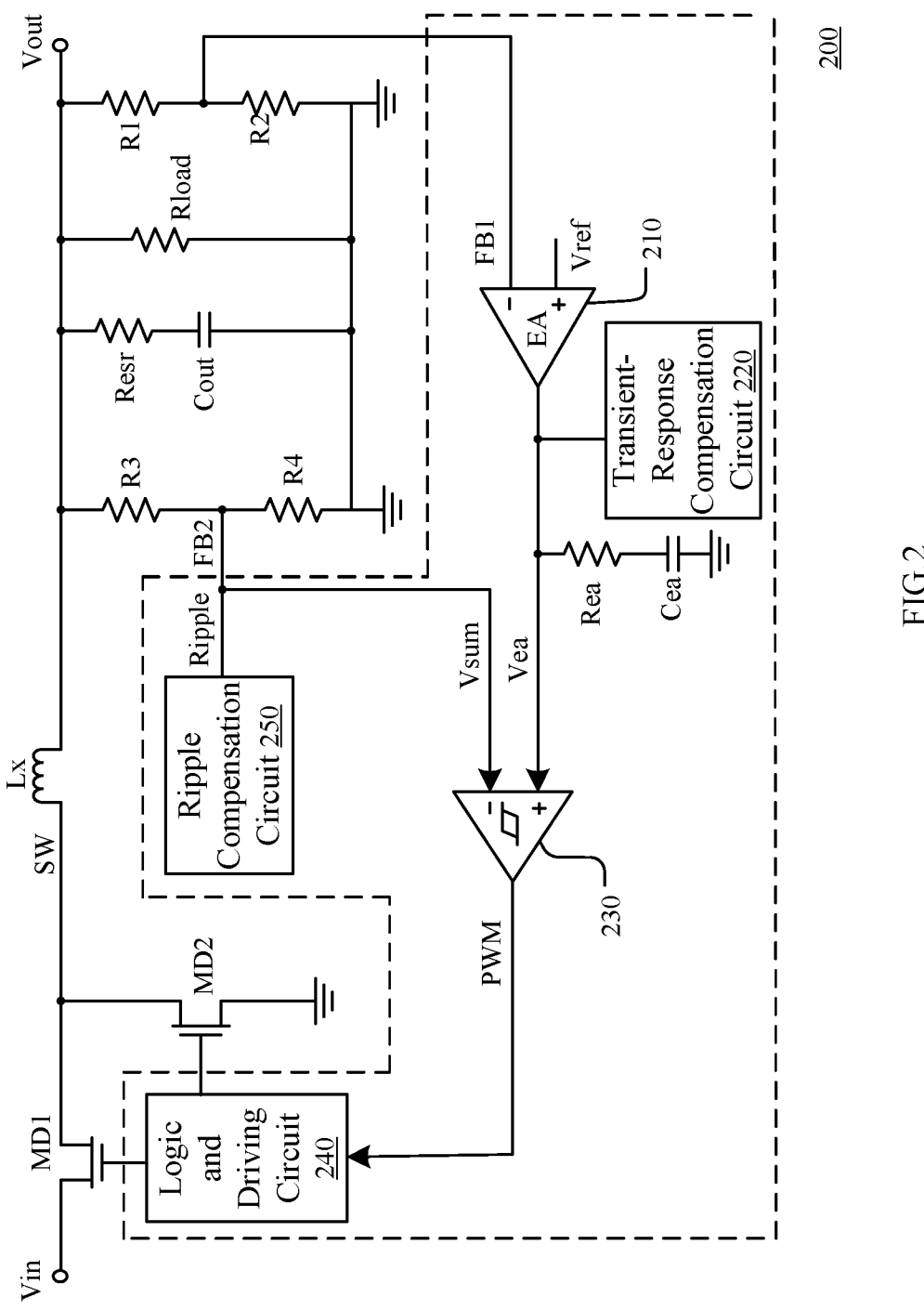
FIG. 2 illustrates a schematic circuit diagram of a switching converter according to an embodiment of the present disclosure.

FIG. 2 illustrates a schematic circuit diagram of a switching converter according to an embodiment of the present disclosure. The switching converter 200 has a Buck-type topology and includes a power circuit and a control circuit. The power circuit includes switching transistors MD1 and MD2 which are coupled in series between an input terminal and the ground. The switching transistor MD1 is also referred to as a main switching transistor, the switching transistor MD2 is also referred to as a synchronous switching transistor. An inductor Lx is coupled between an intermediate node of the switching transistors MD1 and MD2 and an output terminal. An output capacitor Cout is coupled between the output terminal and the ground. A resistor Resr is an equivalent series resistance of the output capacitor Cout. Moreover, a load RL is coupled in parallel between the two terminals of the output capacitor Cout. The input terminal of the switching converter 200 receives an input voltage Vin, and the output terminal provides an output voltage Vout. A voltage divider network consisting of resistors R1 and R2 is used to obtain a first feedback signal FB1 of the output voltage Vout, and a voltage divider network consisting of resistors R3 and R4 is used to obtain a second feedback signal FB2 of the output voltage Vout.

The control circuit of the switching converter 200 is used to provide switching control signals to the switching transistors MD1 and MD2. The control circuit of the switching converter 200 includes an error amplifier 210, a transient-response compensation circuit 220, a PWM comparator 230, a logic and driving circuit 240, and a ripple compensation circuit 250.

The error amplifier 210 is used to compare the first feedback signal FB1 with the reference voltage Vref to obtain the error signal Vea. Specifically, an inverted input of the error amplifier 210 receives the first feedback signal FB1, a non-inverted input receives the reference voltage Vref, and an output is used to provide the error signal Vea.

The transient-response compensation circuit 220 is coupled to the output of the error amplifier 210 for increasing a differential current of the error amplifier 210 so as to accelerate the rate of change of the output voltage of the error amplifier 210 before a voltage difference between the output voltage Vout and the reference value reaches a predetermined threshold value, thereby improving transient characteristics for the load.

The PWM comparator 230 receives a superposition signal Vsum of the second feedback signal FB2 and the ripple signal Ripple at the inverted input, and receives an error signal Vea at the non-inverted input. The PWM comparator 230 is used to compare the superposition signal Vsum with the error signal Vea to generate a pulse width modulation signal PWM.

In this embodiment, the error amplifier 210 is an error amplifier with a high DC gain, which is beneficial for improving an output accuracy of the switching converter. Further, the PWM comparator 230 has an architecture with an adaptive hysteresis voltage. The hysteresis voltage of PWM comparator 230 is so that the switching converter adaptively adjusts the hysteresis window according to the output voltage to maintain the relative stability of switching frequency, which further improves the problem of a large range of frequency variations of the hysteresis control mode, and is beneficial for improving the frequency stability and efficiency of the system at a light load. Further, a ripple signal Ripple provides an AC signal in phase with an inductor current. The PWM comparator 230 compares the superimposed signal Vsum with the error signal Vea, and according to the comparison results, directly controls on and off states of the switching transistors, which ensures that any change of the output voltage Vout can be quickly fed to the hysteresis comparator to trigger corresponding switching actions, so that the switching converter 200 has a good transient response.

Further, the control circuit also includes a compensation network, which is coupled between the output of the error amplifier EA and the ground, and the compensation network includes a compensation resistor Rea and a compensation capacitor Cea.

The logic and driving circuit 240 is used to implement a logic control function of the system for generating switching control signals for controlling conduction states of the switching transistors MD1 and MD2 based on the pulse width modulation signal PWM. The ripple compensation circuit 250 is coupled to the inductor Lx for providing the ripple signal Ripple.

It should be noted that although FIG. 2 illustrates the embodiment of a Buck-type synchronous switching converter, the present disclosure is not limited to the embodiment. The advantages of the present disclosure are equally applicable to other types of switching converters having, but not limited to, a topology such as floating-ground Buck-type converters, grounded Buck-type converters, flyback-type converters, Buck-Boost-type converters, and Boost-type converters.

Figure 3:
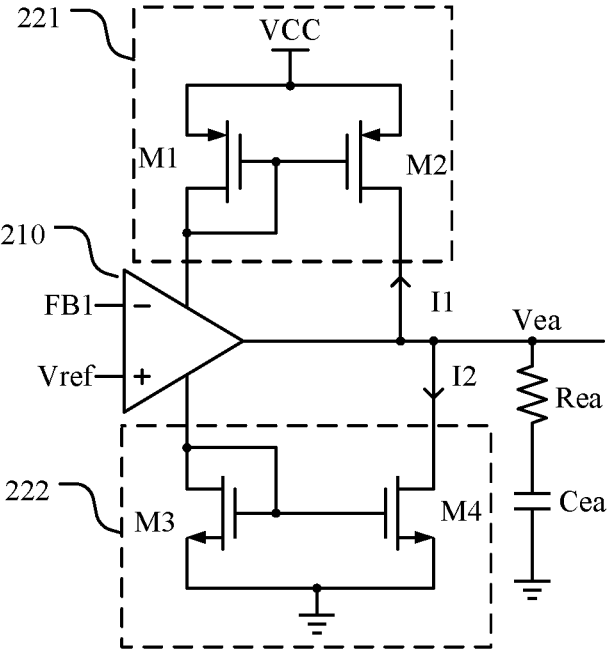
FIG. 3 illustrates a schematic circuit diagram of a transient-response compensation circuit of the switching converter according to the embodiment of the present disclosure.

FIG. 3 illustrates a schematic circuit diagram of a transient-response compensation circuit for the switching converter according to the embodiment of the present disclosure. As shown in FIG. 3, the transient-response compensation circuit 220 includes a pull-up compensation unit 221 and a pull-down compensation unit 222. The pull-up compensation unit 221 and the pull-down compensation unit 222 set a lower-limit threshold VL and an upper-limit threshold VH, respectively, for the transient response compensation response of the present embodiment. When a voltage difference between the first feedback signal FB1 and the reference voltage Vref exceeds the lower-limit threshold VL (i.e. Vref−FB1>VL), the pull-up compensation unit 221 is turned on to provide a pull-up current I1 to the output of the error amplifier 210 to accelerate a rising rate of the error signal Vea and ensure that the output voltage Vout is not too low, thereby improving the transient response. When the voltage difference between the first feedback signal FB1 and the reference voltage Vref exceeds the upper-limit threshold value VH (i.e., FB1−Vref>VH), the pull-down compensation unit 222 is turned on to provide a pull-down current I2 to the output of the error amplifier 210 to accelerate a falling rate of the error signal Vea and ensure that the output voltage Vout is not too high, thereby improving the transient response.

Optionally, the pull-up compensation unit 221 includes transistors M1 and M2. The transistors M1 and M2 constitute a current mirror, the first terminals of which are coupled to the power supply VCC, the control terminals of which are coupled to each other and both are coupled to the second terminal of the transistor M1. The second terminal of the transistor M1 is coupled to the power supply of the error amplifier 210, and the second terminal of the transistor M2 is coupled to an output of the error amplifier 210 to provide the pull-up current I1.

The pull-down compensation unit 222 comprises transistors M3 and M4, the transistors M3 and M4 constitute a current mirror, both of the second terminals of which are coupled to the ground, the control terminals of which are coupled to each other and both are coupled to the first terminal of the transistor M3. The first terminal of the transistor M3 is coupled to the power supply of the error amplifier 210, and the first terminal of the transistor M4 is coupled to the output of the error amplifier 210 to provide the pull-down current I2.

It should be noted that in the above embodiment, the transistors M1 and M2 may be realized, for example, by PMOS transistors, the first terminal, the second terminal and the control terminal of which are the source, the drain and the gate of the PMOS transistors, respectively. Transistors M3 and M4 may be realized, for example, by NMOS transistors, with the first terminal, the second terminal, and the control terminal being the drain, the source, and the gate of the NMOS transistors, respectively.

Figure 4:
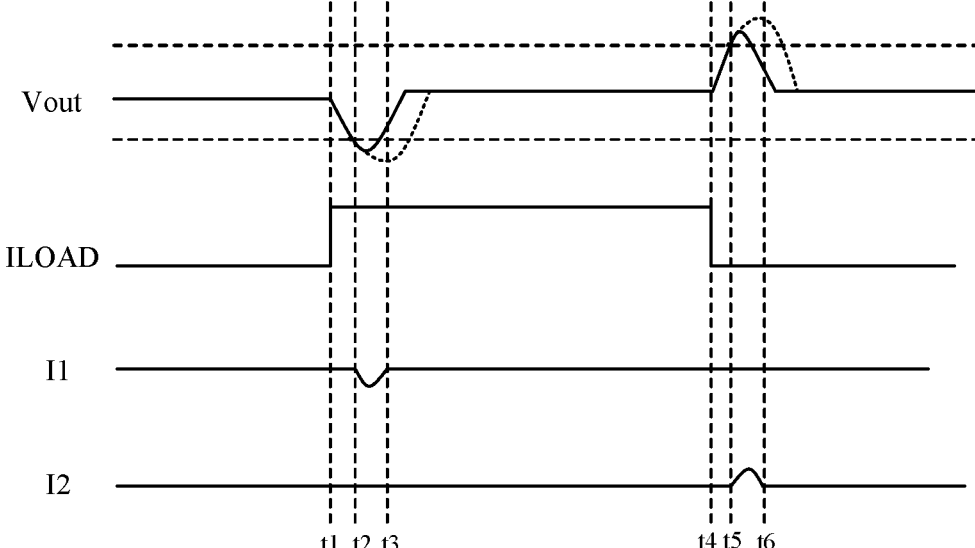
FIG. 4 illustrates a schematic waveform chart of voltage of the switching converter according to the embodiment of the present disclosure during a load change.

FIG. 4 illustrates a schematic waveform chart of voltage of the switching converter according to the embodiment of the present disclosure during a load change. The waveform of the output voltage Vout, the load current ILOAD, the pull-up current I1, and the pull-down current I2 are shown, respectively. In the waveform of the output voltage Vout, a solid line indicates a waveform change of the embodiment of the present disclosure, with the transient-response compensation circuit being added, and a dashed line indicates a waveform change of the prior art, without the transient-response compensation circuit being added.

As shown in FIG. 4, at time t1, the load at the output of the switching converter is increased, the load current ILOAD rises, and the output voltage Vout will be pulled down. At time t2-t3, the output voltage Vout is pulled down to the lower-limit threshold, during which the pull-up current I1 in the transient-response compensation circuit is generated, for pulling the output voltage Vout up and gradually returning to stability. To the contrary, when the load is increased, the output voltage Vout in the conventional switching converter will be pulled down to a very low level and then rises again, as shown at time t3 in the figure. Thus, the switching converter according to the present disclosure has a better transient response compared to the conventional one. Similarly, at time t4, the load at the output of the switching converter decreases, the load current ILOAD decreases, and the output voltage Vout will be pulled up. At time t5-t6, the output voltage Vout is pulled up to the upper-limit threshold, during which the pull-down current I2 in the transient-response compensation circuit is generated, for pulling the output voltage Vout down and gradually returning to stability. To the contrary, the output voltage Vout in the conventional switching converter will be pulled up to a very high level and then falls when the load is decreased, as shown in time t6 in the figure. Therefore, the switching converter according to the embodiment of the present disclosure, compared to the prior art, has a transient-response compensation circuit which is added and can provide a pull-up current or a pull-down current when the output voltage Vout is too low or too high, so that the output of the error amplifier can be compensated quickly to ensure that the output voltage Vout will not be too low or too high, and the transient response characteristics are better.

Figure 5A:
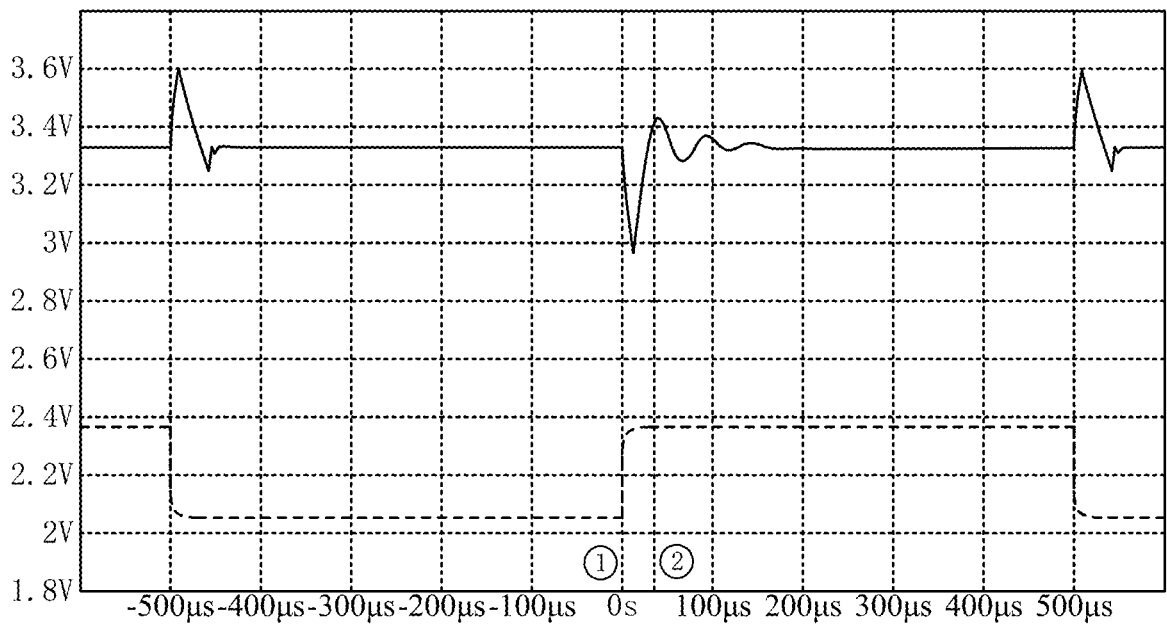
FIGS. 5A and 5B present test diagrams comparing a conventional switching converter and a switching converter according to the embodiment of the present disclosure, respectively.
Figure 5B:
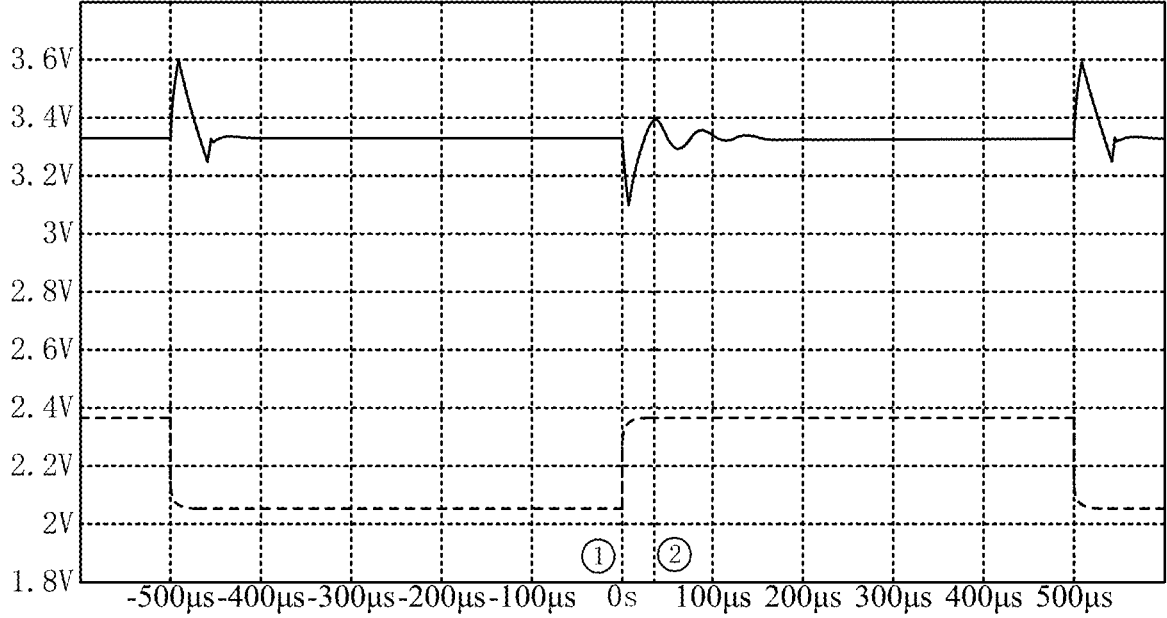

FIG. 5A and FIG. 5B present test diagrams comparing a conventional switching converter and a switching converter according to the embodiment of the present disclosure, respectively. FIGS. 5A and 5B show variations of the output voltage with variations of the output current. In FIGS. 5A and 5B, an input voltage Vin=3.0V, an output voltage Vout=3.3V, an output current Iout1=0.2 A, and an output current Iout2=1.8 A. As can be seen from the figure, when the output current increases from 0.2 A to 1.8 A, the fluctuation of switching converter Vout of the switching converter according to the present disclosure is smaller than that of the output voltage of the prior art, thus the transient characteristics are better.

To sum up, in the switching converter and the control circuit therefor according to the embodiments of the present disclosure, the control circuit further includes a transient-response compensation circuit. The transient-response compensation circuit is used to increase the differential current of the error amplifier when the output voltage deviates significantly from the reference value so as to accelerate the rate of change of the output voltage. This can prevent excessive or insufficient fluctuations in the output voltage when the load changes, improving the transient response characteristics of the switching converter and optimizing the dynamic characteristics of the switching converter over a wide range of load in a continuous operation mode. In addition, the transient-response compensation circuit in these embodiments is very simple in the circuit structure and does not require significant modifications to the conventional switching converter architecture. It has a low cost and is suitable for various conventional switching converters.

In the above description, the well-known structural elements and steps are not explained in detail. However it will be understood by those skilled in the art that the corresponding structural elements and steps can be realized by various technical means. In addition in order to form the same structural elements those skilled in the art may devise methods that are not exactly the same as those described above. In addition although the embodiments are described separately above this does not mean that the measures in the embodiments cannot be advantageously used in combination.

These embodiments are not exhaustively described in all detail in accordance with the present disclosure's practices such as the above and are not limiting the disclosure to specific embodiments only. Obviously, according to the above description, many modifications and changes can be made. These embodiments are selected and specifically described in this specification in order to better explain the principle and practical application of the present disclosure, so that those skilled in the art can make good use of the present disclosure and its modification based on the present disclosure. The scope of protection of the present disclosure rights shall be subject to the scope defined in the present disclosure's claims.

What is claimed is:

1. A control circuit for a switching converter, which includes at least one switching transistor to control transfer of electrical energy from an input terminal to an output terminal so as to generate an output voltage in accordance with an input voltage, comprising:

an error amplifier which compares a first feedback signal of the output voltage with a reference voltage to generate an error signal;

a transient-response compensation circuit which is coupled to an output terminal of the error amplifier for increasing a differential current of the error amplifier to increase a rate of output change of the error amplifier in a case that a voltage difference between the first feedback signal and the reference voltage exceeds a predetermined threshold; and a PWM comparator which compares a superposition signal of a second feedback signal of the output voltage and a ripple signal with the error signal to generate a pulse width modulated signal for controlling an on time of the at least one switching transistor, wherein the transient-response compensation circuit comprises:

a pull-up compensation unit which is turned on when the voltage difference between the first feedback signal and the reference voltage exceeds a lower-limit threshold to provide a pull-up current to the output terminal of the error amplifier to increase a rising rate of the error signal; and a pull-down compensation unit which is turned on when the voltage difference between the first feedback signal and the reference voltage exceeds an upper limit threshold to provide a pull-down current to the output terminal of the error amplifier to increase a falling rate of the error signal.

2. The control circuit according to claim 1, wherein the pull-up compensation unit comprises:

a first transistor and a second transistor which constitute a current mirror, and each of which has a first terminal being coupled to a power supply, and a control terminal being coupled to a second terminal of the first transistor so that the control terminals of the first transistor and the second transistor are coupled with each other, wherein a second terminal of the first transistor is further coupled to a power supply terminal of the error amplifier, and the a second terminal of the second transistor is further coupled to the output terminal of the error amplifier.

3. The control circuit according to claim 2, wherein the first transistor and the second transistor are PMOS transistors, respectively.

4. The control circuit according to claim 1, wherein the pull-down compensation unit comprises:

a third transistor and a fourth transistor which constitute a current mirror, and each of which has a second terminal being coupled to the a ground, and a control terminal being coupled to a first terminal of the third transistor so that the control terminals of the third transistor and the fourth transistor are coupled with each other, wherein a first terminal of the third transistor is further coupled to the power supply terminal of the error amplifier, and a first terminal of the fourth transistor is further coupled to the output terminal of the error amplifier.

5. The control circuit according to claim 4, wherein the third transistor and the fourth transistor are NMOS transistors, respectively.

6. The control circuit according to claim 1, further comprising:

a logic and driving circuit which converts a pulse width modulation signal into a switching control signal for controlling a conduction state of the at least one switching transistor.

7. The control circuit according to claim 1, further comprising:

a ripple compensation circuit for generating the ripple signal.

8. The control circuit according to claim 1, wherein the PWM comparator is a hysteresis comparator which adaptively adjusts a hysteresis voltage in accordance with the output voltage to stabilize a switching frequency.

9. A switching converter comprising:

a power circuit which includes at least one switching transistor to control transfer of electrical energy from an input terminal to an output terminal so as to generate an output voltage in accordance with an input voltage and a control circuit according to claim 1, which generates a switching control signal for controlling a conduction state of the at least one switching transistor.

10. The switching converter according to claim 9, wherein the power circuit has a topology selected from a group consisting of floating Buck-type power circuit, grounded Buck-type power circuit, flyback-type power circuit, Buck-Boost-type power circuit, Boost-type power circuit, and Boost-type power circuit.

*  *  *  *  *